Oct. 22, 1935.   S. B. BLAISDELL   2,018,596
MACHINE FOR MAKING BRAIDED BRAKE LININGS
Original Filed Aug. 18, 1930   5 Sheets-Sheet 1
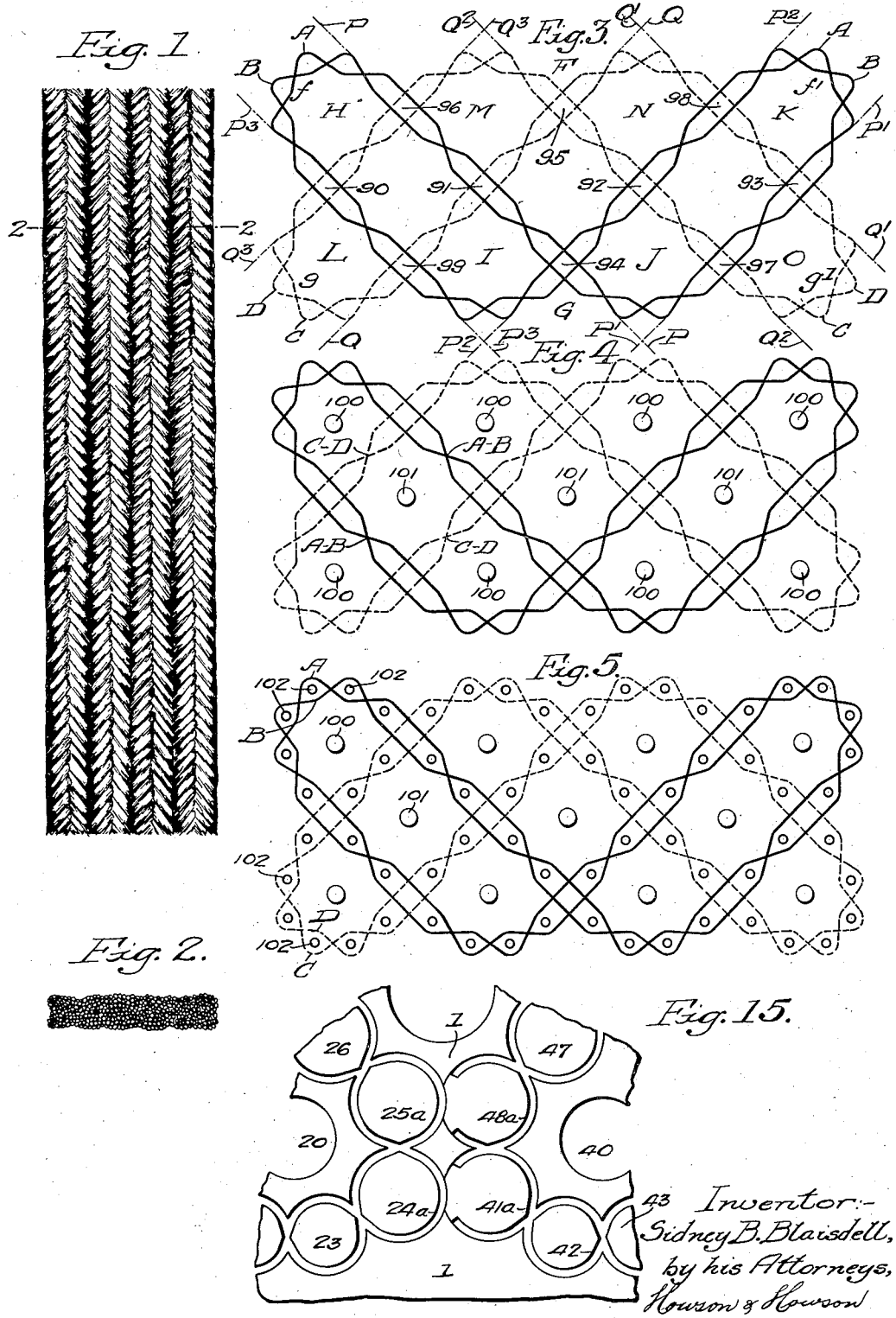
Inventor:—
Sidney B. Blaisdell,
by his Attorneys,
Howson & Howson Oct. 22, 1935. S. B. BLAISDELL 2,018,596
MACHINE FOR MAKING BRAIDED BRAKE LININGS
Original Filed Aug. 18, 1930  5 Sheets-Sheet 2
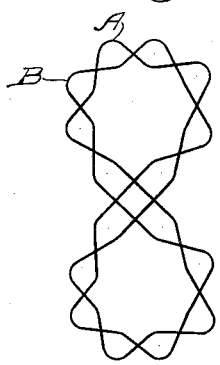
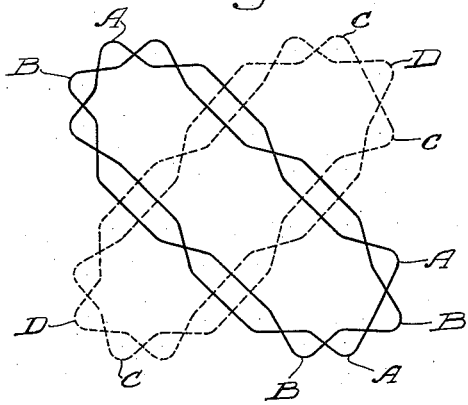
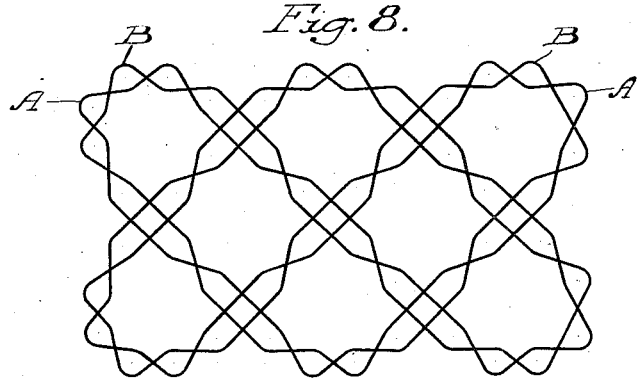
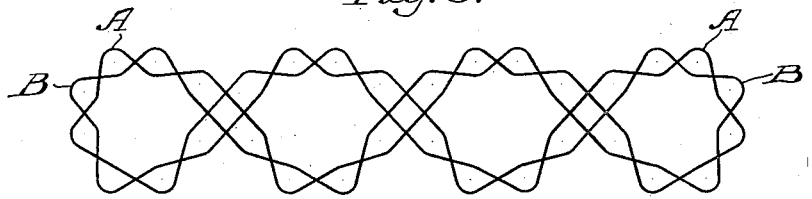
Inventor:-
Sidney B. Blaisdell,
by his Attorneys,
Howson & Howson Oct. 22, 1935.  S. B. BLAISDELL  2,018,596
MACHINE FOR MAKING BRAIDED BRAKE LININGS
Original Filed Aug. 18, 1930  5 Sheets-Sheet 3

Inventor:-
Sidney B. Blaisdell,
by his Attorneys,
Howson & Howson

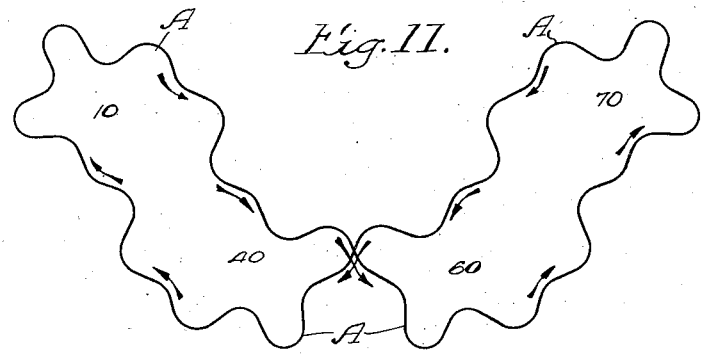
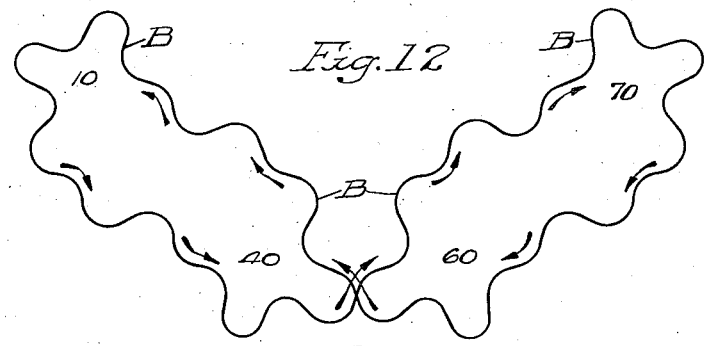
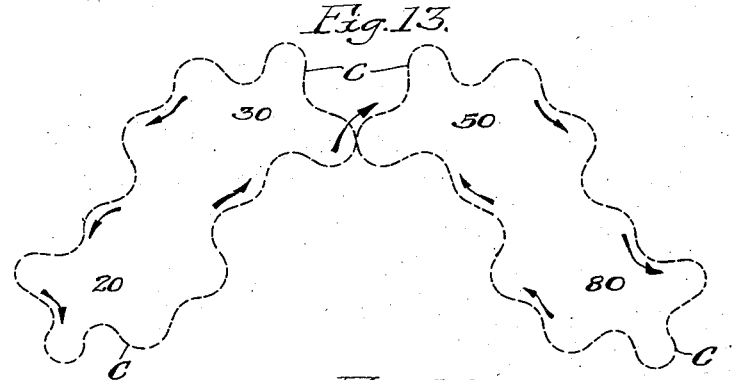
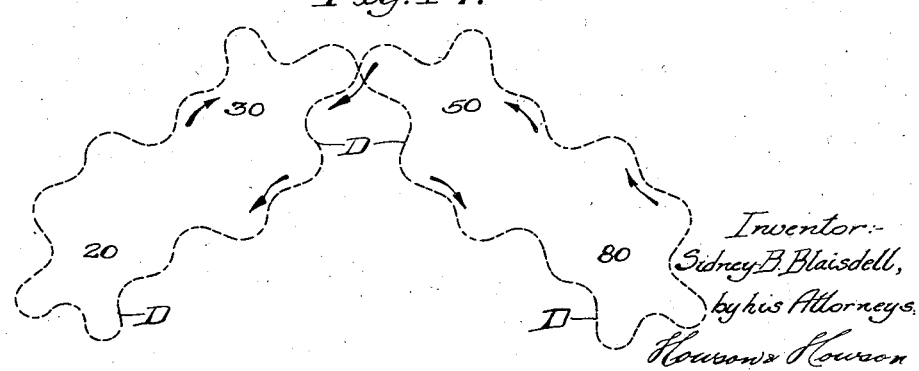

Oct. 22, 1935.   S. B. BLAISDELL   2,018,596
MACHINE FOR MAKING BRAIDED BRAKE LININGS
Original Filed Aug. 18, 1930   5 Sheets-Sheet 5

Inventor:-
Sidney B. Blaisdell
by his Attorneys,
Howson & Howson

Patented Oct. 22, 1935

2,018,596

UNITED STATES PATENT OFFICE 2,018,596

MACHINE FOR MAKING BRAIDED BRAKE LININGS

Sidney B. Blaisdell, Wyncote, Pa., assignor to Fidelity Machine Company, Wilmington, Del., a corporation of Delaware Original application August 18, 1930, Serial No. 476,147. Divided and this application January 26, 1932, Serial No. 588,954

3 Claims. (Cl. 96—3)

This application is a division of my application for patent filed August 18, 1930, Serial No. 476,147.

This invention relates to a braided brake lining, to a process for impregnating the brake lining fabric with a suitable substance or compound commonly used in the manufacture of brake lining, and to a machine adapted for producing the impregnated fabric.

One object of the invention is to provide a brake lining in which the threads are so interbraided that no loose ends will develop as the brake lining wears away under conditions of use.

Another object of the invention is to impregnate the fabric during the course of the braiding operation, so that all the threads of the fabric will be thoroughly impregnated when the fabric is completed.

Another object of the invention is to provide a machine which will accomplish the braiding and the impregnation of the fabric in the manner above noted.

The construction of the brake lining, the machine for making it, and the process involved will be fully disclosed hereinafter, reference being had to the accompanying drawings, of which:

Fig. 1 is a face view of a strip made in accordance with the principles of my invention;

Fig. 2 is a cross section of the strip taken on the lines 2—2, Fig. 1;

Fig. 3 is a diagrammatic view similar to Fig. 2, showing the relation of the threads;

Figs. 4 and 5 are views similar to Fig. 3, showing ways and means of thickening the strip;

Figs. 6, 7 and 8 are views similar to Fig. 3, but showing strips of various widths;

Fig. 9 is a view similar to Fig. 3, but showing a strip of lesser thickness;

Figure 16:
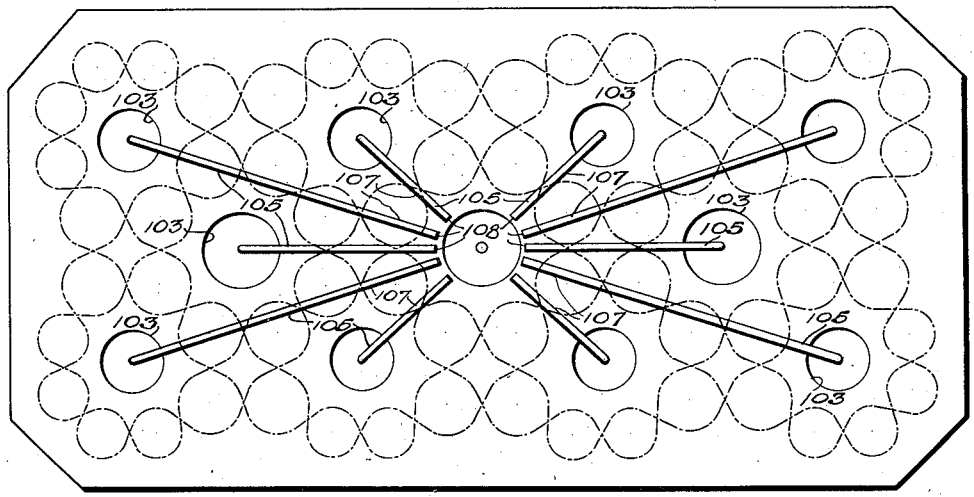
Figure 17:
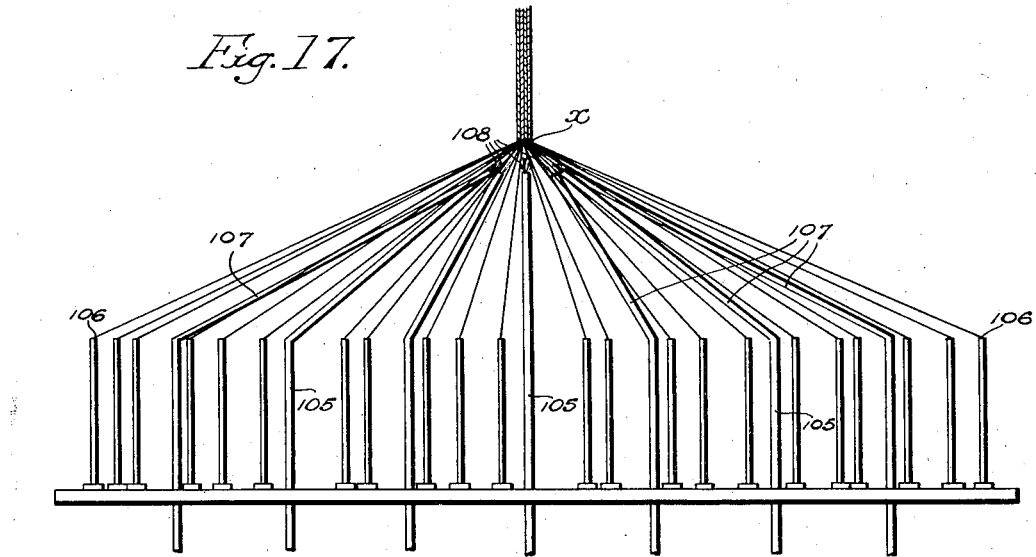

Fig. 11 diagrammatically illustrates the path of one series of thread carriers;

Fig. 12 diagrammatically illustrates the path followed by a series of thread carriers directly cooperating with those that follow the path shown in Fig. 11;

Fig. 13 is a view similar to Fig. 11, showing the path followed by another series of thread carriers that cross the path shown in Fig. 11;

Fig. 14 is a view similar to Fig. 12, showing the path of the carriers that cooperate directly with those that travel the path shown in Fig. 13;

Fig. 15 is a plan view of a portion of the carrier platform as arranged for producing narrow or thin strips;

Fig. 16 is a plan view of the supporting platform for the carriers, the path of the carriers being shown diagrammatically in broken lines and the impregnating nozzles being shown in full; and Fig. 17 is a side elevation diagrammatically showing the relation between the spraying nozzles and the threads being impregnated thereby.

The braiding machine employed for making the strip according to the principles of my present invention is similar in general construction to the braiding machine shown and described in my prior U. S. Patent No. 1,742,126, dated December 31, 1929, the difference in the present machine having to do with the bobbin or thread carrier supporting platform and the guide slots formed therein for guiding the carriers along paths which will produce a strip of the character hereinafter described.

The carrier supporting platform 1 forming the subject of the present invention is provided with the usual guide slots 2 for the guiding of carriers similar in character to those shown in my above mentioned prior patent, the usual horn gears being provided under the platform for moving the carriers in various directions along the guideways 2 to effect braiding and interbraiding of the threads carried by the carriers.

In the present case the guideways 2 are arranged in sectional groups 10, 20, 30, 40, 50, 60, 70 and 80. Each group comprises a series of substantially circular parts 11 to 18, 21 to 28, 31 to 38, 41 to 48, 51 to 58, 61 to 68, 71 to 78 and 81 to 88 respectively.

The carriers are divided into series A, B, C and D. In the present instance each series comprises thirty-seven carriers $A^1$ to $A^{37}$, $B^1$ to $B^{37}$, $C^1$ to $C^{37}$, $D^1$ to $D^{37}$ respectively.

The series A and B operate in opposite directions respectively along cooperating paths extending in the same general directions as shown in Figs. 11 and 12, through the groups 10, 40, 60 and 70, while the series C and D operate in opposite directions respectively along cooperating paths extending in the same general directions through the groups 20, 30, 50 and 80.

As shown in Fig. 3, the threads of series A are braided with the threads of series B at each of the circular portions of their pathways, and the threads of series C are braided with the threads of series D in a like manner at each circular portion of each group thereof throughout their pathways, thus the threads of series A and B are braided together and the threads of series C and D are likewise braided together, as clearly shown in Fig. 3.

As shown in Fig. 3, the pathways of series A—B cross the pathways of series C—D diagonally within the strip as shown at 90, 91, 92 and 93 in said figures, thus an interbraiding of all the threads of all the series is effected within the strip, the threads of series A—B starting at one corner f on one face F of the strip passing diagonally through the strip to the center of the opposite face G thereof and thence diagonally through the strip again to the first mentioned face F but at the opposite side or corner $f^1$ thereof, and the threads of series C—D starting at the corner g of the face G, passing diagonally through the strip at the center of the face F, thence diagonally through the strip to the corner $g^1$ of the face G, crossing the series A—B at the points 90, 91, 92 and 93, as above described.

In this manner, when the strip wears under conditions of use the entire number of threads of which the strip is composed are so interbraided that no loose ends develop, the strip, therefore, does not break down and may be kept in use until substantially the whole strip is worn away, thus insuring an even uniform breaking action at all times and eliminating the erratic braking action accompanying brake linings which when partially worn develop loose ends that get between the brake drums and brake shoes and cause a sudden gripping at one time and practically no grip at all upon a subsequent application of the brake.

As each pair of cooperating series of carriers A—B or C—D travel around the groups of circular portions of their pathways they form longitudinally extending sections of the strip, for example, the carriers of series A—B in passing around the circular portions of the pathway in groups 10, 40, 60 and 70 form longitudinally extending sections H, I, J and K, and the carriers of series C—D in passing around the circular portions of groups 20, 30, 50 and 80 form longitudinally extending sections L, M, N and O of the strip. Each of these sections of the strip is tied to the adjacent sections by the threads of the series A—B or C—D, passing from one section to the other section formed by these series respectively and the sections are all tied together by the diagonal crossing of the series A—B and C—D in the manner above noted.

Figure 10:
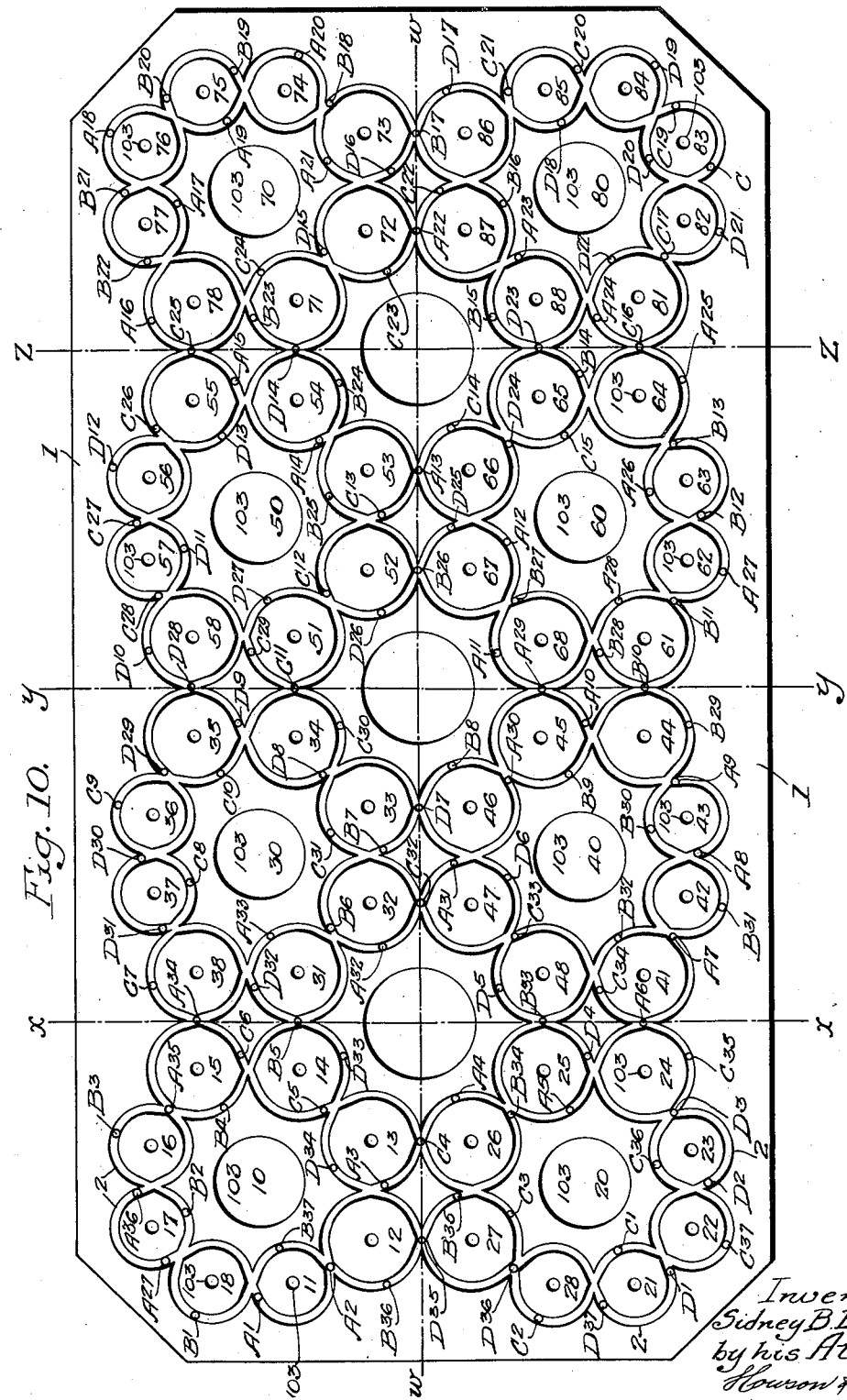
Fig. 10 is a plan view of the supporting platform for the carriers by which the braiding of the threads is accomplished.

Narrower or thinner strips may be produced by utilizing various portions of the platform 1, it being noted from Fig. 10 that the groups 10, 30, 50 and 70 are arranged in one line to produce one face F of the strip while the groups 20, 40, 60 and 80 are arranged in a similar line parallel to the first said line to produce the opposite face G of the strip. The corresponding groups of the parallel lines are arranged directly opposite to each other, i. e. the group 20 is opposite to the group 10, the group 40 is opposite the group 30, the group 60 is opposite the group 50 and the group 80 is opposite the group 70.

Thus it will be seen that by utilizing either of the aligned groups 10, 30, 50, 70 or 20, 40, 60, 80 the carriers may be arranged to travel through either of these aligned groups without passing into the other of the aligned groups, to produce a thinner strip of the nature shown in Fig. 9.

This is accomplished, for example, by making the pathways 12, 13, 32, 33, 52, 53, 72 and 73 circularly continuous at the center line w—w of the platform instead of their interconnecting with the corresponding groups of the other aligned series lying at the opposite side of said center line.

Likewise narrower strips of the nature shown in Figs. 6, 7 and 8 may be made by utilizing certain groups of the two parallel series of groups, for example, to produce the strip shown in Fig 6, groups 10 and 20 may be used, the circular parts 15, 14, 25 and 24 thereof being made continuous and not interconnecting with the corresponding parts 38, 31, 48 and 41 of the groups 30 and 40 which lie adjacent the parts 15, 14, 25 and 24 of the groups 10 and 20, along the dividing line x—x between the groups 10—20 and 30—40.

In producing the strip shown in Fig. 7, groups 10, 20, 30 and 40 may be used, the parts 35, 34, 45 and 44 of the groups 30 and 40 respectively being continuously circular and not connecting with the corresponding parts 58, 51, 68 and 61 of groups 50 and 60 respectively which lie adjacent the groups 30 and 40 along the dividing line y—y.

Likewise in producing the strip shown in Fig. 8, three of the double groups are used i. e., 10—20, 30—40 and 50—60, the parts 55 and 54 of group 50 being continuously circular and not connecting with the corresponding parts 78 and 71 of the groups 70 and 80 along the dividing line z—z, the parts 65 and 64 of group 60 being likewise continuous and not connecting with the corresponding parts 88 and 81 of the group 80 lying adjacent thereto at the dividing line z—z.

These changes in the pathways for forming the corners of one of the narrower strips are clearly shown in Fig. 15, the parts 24, 25, 41 and 48 of the platform 1 being replaced by parts 24a, 25a, 41a and 48a, respectively.

Regardless of the width or thickness of the strip each strip comprises two or more longitudinally extending sections composed of a plurality of braided threads that pass from one section to the next adjacent section, tying adjacent sections together.

The strips may be thickened by placing longitudinally extending filler threads in the center of each or any desired number of the longitudinally extending sections of the strip as shown at 100 in Fig. 4, the threads of each of the various groups that enter into the particular section passing around the filler or core threads 100. Additional filler threads 101 may also be inserted at the places where diagonally crossing series of threads cross each other, as shown in Fig. 4, the threads of series A—B, for example, lying at opposite sides of each filler thread 101 while the threads of series C—D lie at opposite sides of the said filler threads 101, substantially at right angles to the threads of series A—B.

In Fig. 5 a longitudinally extending filler thread 102 is shown in the center of each of the circular portions of each of the groups thereof.

It is customary in producing brake lining to use an asbestos yarn twisted with or around fine metal wires to give strength and endurance to the brake lining and the machine employed in the production of brake lining strips as above described is capable of using this type of yarn which in the above description is referred to as threads.

In order to permit the passage of the filler threads to the center of each of the circular portions of each circularly arranged group of such circular sections, to permit of the passage of filler threads to the center of each of said circularly arranged groups, and to permit of the passage of filler threads to the points outside the circularly arranged groups on a line intermediate the parallel rows of circular groups, the platform 1 is provided with openings 103 at the points mentioned and through which the said filler threads are adapted to pass.

From the above description taken in conjunction with Fig. 3 of the drawings, it will be obvious that the strip made in accordance with the principles of my invention comprises two main series of threads A—B and C—D, that the divisional series A crosses and is braided with the divisional series B throughout the strip to form the main series A—B, that the divisional series C crosses and is braided with the divisional series D throughout the strip to form the main series C—D; that the main series A—B starting at the corner $f$ of the strip passes in a diagonal plane P from said corner through the strip to a point substantially at the center of the opposite face G of the strip, then passes in a diagonal plane $P^1$, disposed at a reverse angle to that of the plane P, to the corner $f^1$ of the strip, thence around the said corner $f^1$ into a diagonal plane $P^2$ crossing the first said plane P at a point 94 adjacent the face G of the strip. The series A—B then progresses in another diagonal plane $P^3$ to the corner $f$ of the strip passing around the said corner to the starting point in the plane P.

The threads of divisional series A are at all times throughout the strip running in opposite directions to the threads of divisional series B, and as the threads of these respective series progress through the strip they lay at an angle with respect to each other and cross each other in the planes defining their path as above noted.

Likewise the divisional series C and D progress through the strip in diagonal planes Q, $Q^1$, $Q^2$ and $Q^3$, starting at the corner $g$ of the strip and progressing through the plane Q to the face F of the strip, thence through the reverse angle plane $Q^1$ to the corner $g^1$, thence around the corner $g^1$ into the plane $Q^2$, which parallels the plane $Q^1$, to the face F of the strip, the plane $Q^2$ crossing the plane Q at the point 95. The series C—D then passes into the reverse angle plane $Q^3$, which parallels the plane Q, advancing to and around the corner $g$ of the strip into the plane Q.

The plane P of series A—B, it will be noted, crosses the plane $Q^3$ of the series C—D at the point 96, the plane Q of the series C—D at the point 91, and the plane $P^2$ of the series A—B at the point 94.

The plane $P^1$ of the series A—B crosses the plane $Q^2$ of the series C—D at the point 97 and the plane $Q^1$ of the series C—D at the point 93.

The series A—B then rounds the corner $f^1$ of the strip and passes into the plane $P^2$ which crosses the plane $Q^1$ of the series C—D at the point 98, the plane $Q^2$ of the series C—D at the point 92, the plane P of the series A—B at the point 94.

The plane $P^3$ of the series A—B then crosses the plane Q of the series C—D at the point 99 and the plane $Q^3$ of series C—D at the point 90.

The series A—B then returns to and rounds the corner $f$ of the strip and follows again through the circuit starting in the plane P.

The series C—D follows a similar path in reverse order starting at the corner $g$ progressing through planes Q, $Q^1$ to corner $g^1$, then returning by planes $Q^2$ and $Q^3$ to the corner $g$. Thus it will be seen that the divisional series of each main series of threads are braided together and that the two main series are interbraided so as to form a compact substantial strip which, as it wears under use, will present the cross-sectional areas of the individual threads to the wearing surface due to the interbraiding of the threads in the manner noted, thus no pieces or ends of the threads will come loose to cause erratic functioning of the brake, as so frequently occurs in woven brake linings where the warp threads wear away and leave the weft threads free, or vice versa.

In order to impregnate the fabric thoroughly with a compound, usually rubber, which is usually introduced into brake linings that are subsequently placed in a mold and heated to cause the rubber to flow and thereby unite all portions of the brake lining by the frictional substance, I provide spray nozzles 105, 105 which are connected to a common source of supply, such as a pump (not shown).

The spray nozzles 105, 105 project upwardly through the openings 103, 103 of the platform 1, to the plane of the upper thread guiding ends 106 of the bobbin carriers, as shown in Fig. 17. Each of the nozzles 105 then extends at an angle toward the braiding point X of the machine as indicated at 107 in Fig. 17.

Each nozzle 105 is disposed at the center of a group of the circular portions of the pathways traveled by the carriers, thus as the carriers move about their respective paths the threads carried by the individual carriers are moved across the mouths 108 of the nozzles 105.

With the compound being forced, in a liquid state, through the nozzles 105 the threads as they pass across the mouths 108 of the nozzles 105 will be sprayed and thereby thoroughly impregnated with the compound just before the threads pack together at the braiding point X of the machine, thus the entire fabric is thoroughly impregnated with the compound.

I claim:

1. The combination of a supporting platform, a plurality of thread guides movable in intertwining paths over said platform, and a series of spray nozzles spaced apart on and projecting above the platform between the threads carried by the thread guides with some of said nozzles extending at an angle with respect to the platform.

2. The combination of a supporting platform, a plurality of thread guides movable in intertwining paths over said platform, and a series of spray nozzles spaced apart on and projecting above the platform between the threads carried by the thread guides with some of said nozzles extending at an angle with respect to the platform and all the nozzles pointing toward the braiding point of the machine.

3. The combination of a supporting platform, a plurality of thread guides movable in intertwining paths over said platform, a series of spray nozzles disposed at spaced points on and projecting above the platform to a plane substantially the same as that of the upper ends of the thread guides, some of said spray nozzles being bent at an angle to the plane of the platform above the upper ends of the thread guides and extending between the threads carried by the thread guides.

SIDNEY B. BLAISDELL.